US005101317A

United States Patent [19]

Cwirzen et al.

[11] Patent Number: 5,101,317

[45] Date of Patent: Mar. 31, 1992

[54] OVERLOAD PROTECTOR FOR TELECOMMUNICATIONS SYSTEMS

[75] Inventors: Casimir Z. Cwirzen, Arlington Heights; Eric A. Scheithauer, Chicago; Arnold M. Ladd, Desplaines, all of Ill.

[73] Assignee: Northern Telecom Limited, Montreal, Canada

[21] Appl. No.: 363,269

[22] Filed: Jun. 8, 1989

[51] Int. Cl.[5] .......... H02H 9/06

[52] U.S. Cl. .......... 361/119; 361/127; 337/32; 337/34

[58] Field of Search .......... 361/117, 118, 119, 124, 361/126, 127; 337/20, 32, 33, 34

[56] References Cited

U.S. PATENT DOCUMENTS

| | | | |
|---|---|---|---|
| 4,434,449 | 2/1984 | Dickey | 361/124 |
| 4,594,635 | 6/1986 | Scheithauer et al. | 361/124 X |
| 4,736,269 | 4/1988 | Amein et al. | 361/124 X |

*Primary Examiner*—Derek S. Jennings
*Attorney, Agent, or Firm*—Foley & Lardner, Schwartz, Jeffery, Schwaab, Mack, Blumenthal & Evans

[57] ABSTRACT

An overload protector for a telecommunications system with an overcurrent protection device for each signal line in a chamber formed between a housing and a base and in which the base carries the line and ground pins and also an overvoltage device for each pair of the signal pins, the overvoltage device disposed at the base. In one construction, each overvoltage device comprises a solid state semi-voltage surge protection device at the base and a ground conductor extends laterally of the base between the ground pin and the device.

20 Claims, 4 Drawing Sheets

OVERLOAD PROTECTOR FOR TELECOMMUNICATIONS SYSTEMS

BACKGROUND OF THE INVENTION

1. Field of Invention

This invention relates to overload protectors for telecommunications systems.

2. Brief Description of the Related Art

In the telecommunications industry, it is conventional practice to provide overload protectors at central offices for incoming lines. Such protectors protect telephone equipment within customer's premises from damage such as could be caused by overvoltage or overcurrent conditions. These conditions may suddenly occur. For instance, an overvoltage condition may be as a result of a lightning strike to an outside line. Brief overcurrent conditions may cause no damage, especially if an overcurrent condition only slightly exceeds that for which a telecommunications circuit is designed. However, more prolonged overcurrent conditions which are only slightly in excess of the desired maximum value may result in elevated overheating of circuitry to cause gradual burning of insulation and other heat sponsored damage to telephone equipment.

In order to protect a customer's circuitry and equipment from damage caused by overvoltage or overcurrent conditions, an overload protector is provided in each line at the central office. Each protector normally includes two overvoltage protection unit devices and two overcurrent protection devices, the protection devices providing individual overvoltage and overcurrent protection for each tip line and each ring line.

In the main, an overload protector has previously comprised a pair of spaced carbon electrodes or a gaseous discharge arrangement. In overvoltage conditions, the voltage passes across the space between the electrodes or through a gas filled space to ground. On the other hand, an overcurrent protection device normally comprises a coil of wire mounted around a sleeve, the coil being connected in series between a respective outside circuitry terminal and a corresponding central office terminal of the protector. Heat generated in the coil by overcurrent causes solder to melt thereby releasing a pin within the sleeve, the pin then being spring urged into contact with the ground line thereby shorting out the circuit.

In an overload protector of different structure, as described in U.S. Pat. No. 4,434,449, a sleeve holding a coil is mounted upon a line pin and held in a position spaced from a ground line by solder. An overvoltage protection device is mounted upon an end of the sleeve and is spring urged downwardly towards the ground. Melting of the solder causes the sleeve to move towards the ground, thereby shorting out the circuit.

While conventional overload protectors operate in a generally satisfactory manner, they are of complex and expensive structure with the overcurrent and overvoltage devices and ground lines extending substantial distances within housings away from bases of the protectors, with the terminals extending from the bases away from the housings.

SUMMARY OF THE PRESENT INVENTION

The present invention seeks to provide an overload protector for telecommunications systems of a structure which may be more economical to produce than existing structures.

Accordingly, the present invention provides an overload protector for a telecommunications system comprising: a dielectric base and dielectric housing extending from one side of the base to define a chamber with the base; a ground terminal pin extending from the other side of the base and exteriorly of the chamber; two pairs of signal terminal pins mounted within and extending from the other side of the base; an overcurrent protection device provided for each pair of signal pins each overcurrent protection device connected in a signal line in series between the two pins of its respective pair and operable to connect the signal line to the ground terminal pin upon attainment of overcurrent conditions; and an overvoltage conducting means extending between each signal line and the ground terminal pin, the overvoltage conducting means disposed at the base and including an overvoltage protection device which is operable upon attainment of overvoltage conditions in a respective line to permit the current to pass from the signal line to the ground terminal pin.

With overload protectors according to the invention, the overvoltage protection device of each conducting means is at the base so that the connection from each signal line to the ground terminal pin is rendered as small as possible and is not required to extend away from the base and into the housing. Hence, the amount of conducting material employed in the overload protector is minimized. In one construction of conducting means, a ground conductor extends from the ground pin and is electrically separated from its respective signal line by its associated overvoltage protection device. Alternatively, the overvoltage protection device is mounted with one side directly in electrical contact with the ground terminal pin and without the interposition of the ground conductor.

In practical constructions, each overvoltage protection device comprises a solid state overvoltage protection unit. A solid state overvoltage protection unit may be of extremely small size commensurate with enabling a conducting means to be disposed completely at the base thereby eliminating the need for a ground line to extend away from the base and into the housing.

In a preferred arrangement using a solid state overvoltage protector unit for each overvoltage conducting means, the conducting means also includes a ground conductor extending laterally from the ground terminal pin with the solid state overvoltage protection unit mounted between the ground conductor and the respective signal line. The ground conductor may extend across and engage one side of the base and registration means are preferably provided for locating the ground conductor in a required desired fixed position upon the base. Alternatively, the ground conductor is embedded within the base and in further arrangements, the whole of each conducting means including the solid state overvoltage protection unit is totally embedded within the base.

The invention also includes a method of making an overvoltage protector for a telecommunications system comprising: providing a dielectric base and a dielectric housing for mounting upon one side of the base; mounting a ground terminal pin and two pairs of signal terminal pins within the base and together with: 1) providing an overcurrent protection device for each pair of signal pins on the one side of the base by connecting the overcurrent protection device in a signal line in series between the two pins of its respective pair so as to be operable to connect the signal line to the ground terminal pin upon attainment of overcurrent conditions; and 2) providing an overvoltage conducting means for each pair of signal pins by disposing each overvoltage conducting means at the base and electrically connected between each signal line and the ground terminal pin, the overvoltage connecting means including an overvoltage protection device which is operable upon attainment of overvoltage conditions in its respective signal line to permit current to pass from the signal line to the ground terminal pin; and mounting the housing upon the one side of the base, the overvoltage protection device and the overcurrent protection device sealed within the confines of the base and the housing assembly.

One embodiment of the invention will now be described, by way of example, with reference to the accompanying drawings, in which:

FIG. 1 is an exploded isometric view of an overload protector according to the embodiment;

FIG. 2 an exploded isometric view of the overload protector of the embodiment taken in the opposite direction from FIG. 1;

DETAILED DESCRIPTION OF THE PREFERRED EMBODIMENT

Figure 1:
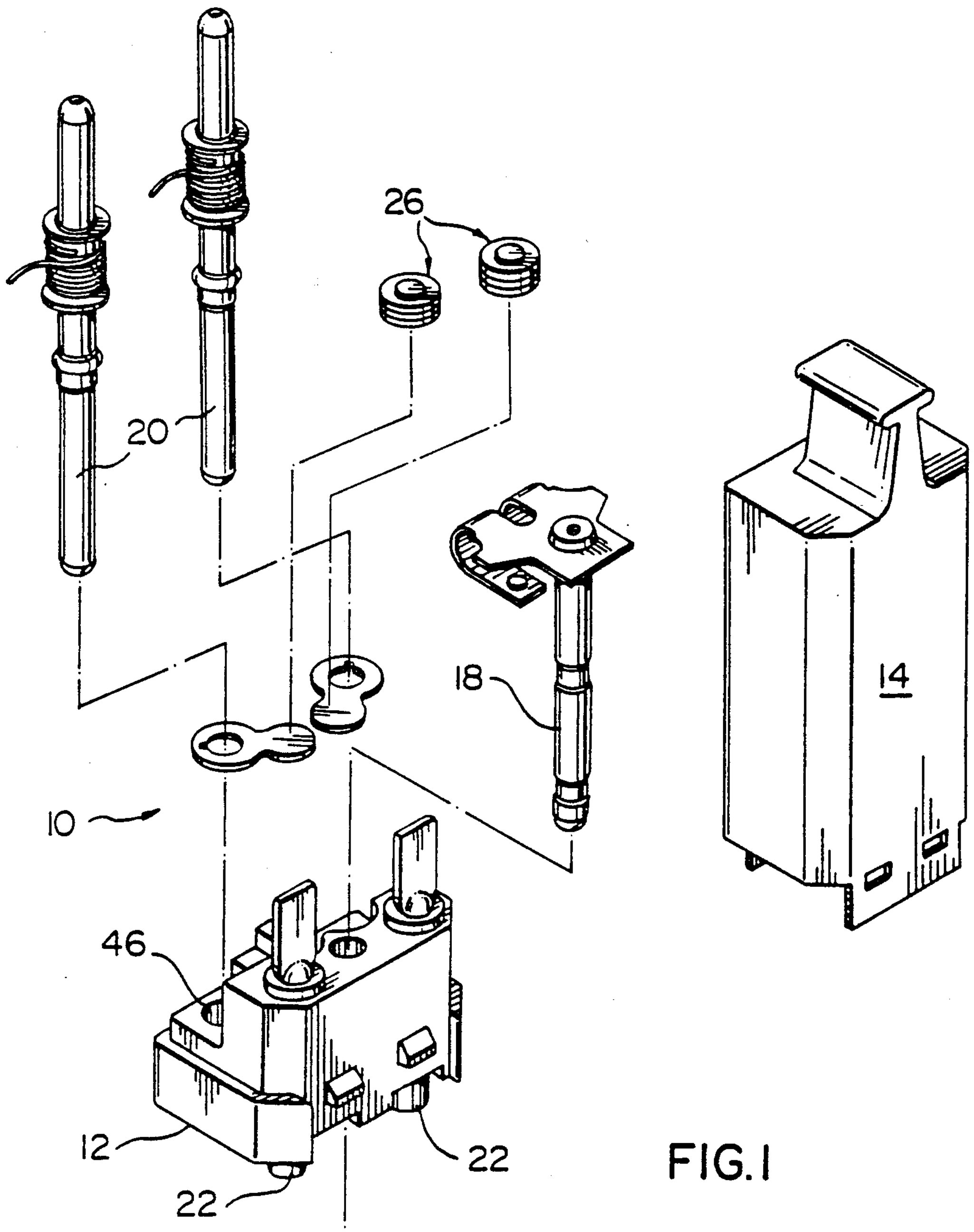
Figure 2:
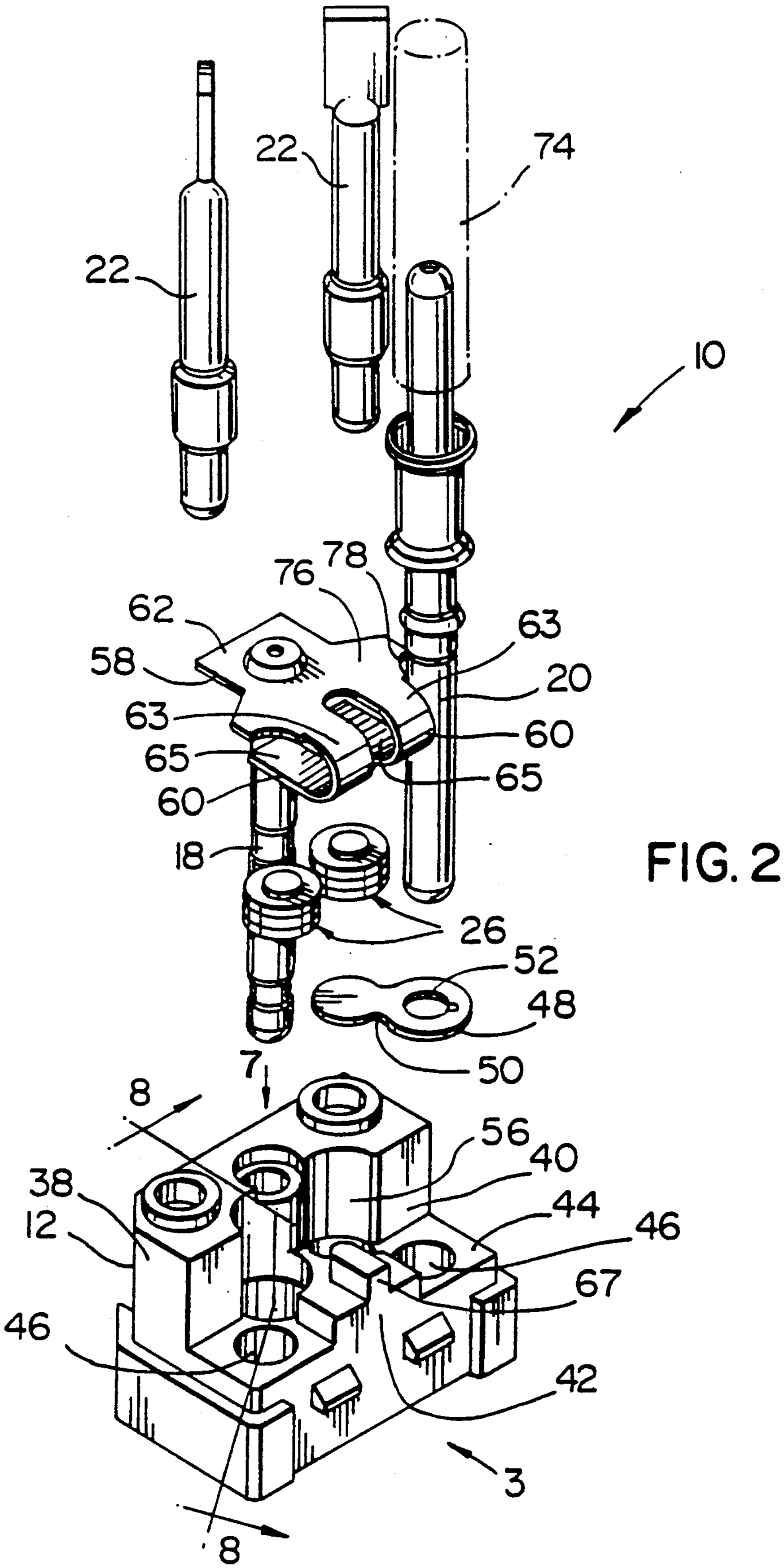
Figure 3:
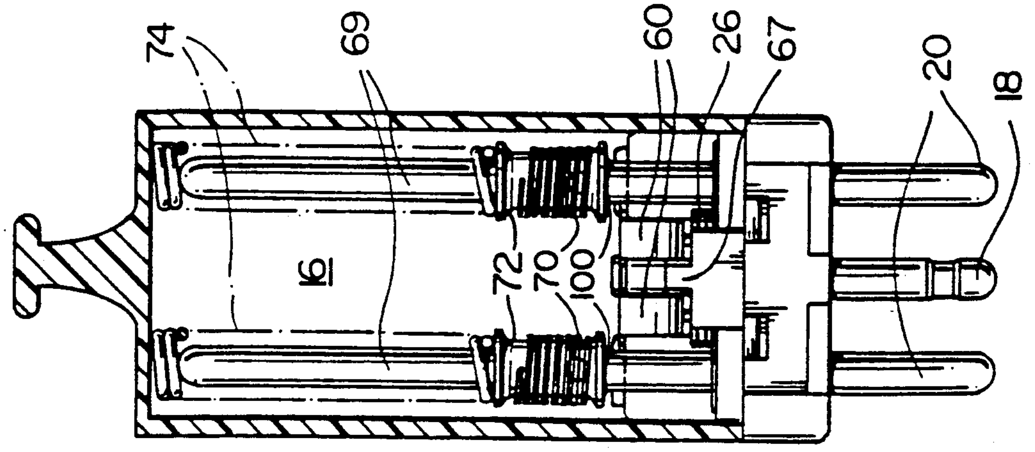
FIG. 3 is a side elevational view, partly in cross-section, of the assembled protector of the embodiment and taken in the direction of arrow III in FIG. 2.

As shown by the embodiment in FIGS. 1, 2 and 3, an overload protector 10 for a telecommunications system comprises a dielectric base 12 and a dielectric housing 14 which, as shown in FIG. 3, extends from one side of the base to define a chamber 16 when the housing and base are assembled together.

The base supports a ground terminal pin 18 and two pairs of signal terminal pins. Each pair of signal terminal pins comprises an outside plant pin 20 and a central office pin 22. All of the pins are received through and are carried by the base so as to extend exteriorly of the assembled protector in the manner shown in FIGS. 3, 4 and 5. As can be seen, as is conventional for signal terminal pins in overload protectors, the outside plant pins 20 extend further outwardly from the base than the central office pins 22 for test purposes.

Figure 6:
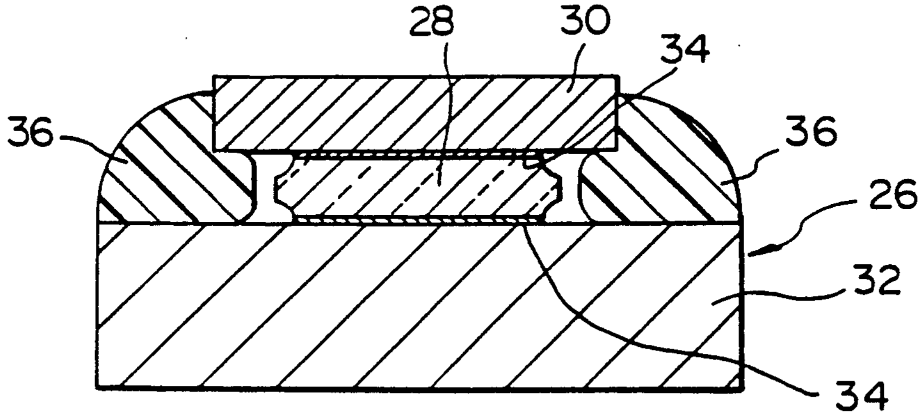
FIG. 6 is a cross-sectional view in side elevation, and to a greatly enlarged scale, of a semi-conductor voltage surge protection device included in the protector of the first embodiment.

An overvoltage protection device is provided for each pair of signal pins. Each overvoltage protection device is a packaged solid state protection unit, i.e. a semi-conductor voltage surge protection device 26 which generally comprises two flat metal electrodes and a semi-conductor voltage surge protection element sandwiched between the electrodes. The structure may be as shown in FIG. 6 which comprises semi-conductor voltage surge protection element 28 positioned between and electrically connected to two electrodes 30 and 32. The electrodes are connected to the voltage surge protection element 28 by layers of solder 34. Annular synthetic resin sealing member 36 extends around and is spaced from the element 28 and is sealingly adhered to both of the electrodes. The resin is a dielectric, flexible environmentally stable material which is non-disruptive under heat conditions created by a voltage surge through the device. A suitable material for this purpose is an RTV thermosetting material or is considered to be one of a family of olefin acrylic copolymers. Included in this family are ethylene acrylic acids, ethylene methacrylic acids, propylene acrylic acids, propylene methacrylic acids and metal salts and esters thereof. These resins readily adhere to the metal electrode when hot, are flexible, dielectric and stable. A particularly suitable resin is an ethylene acrylic acid copolymer.

Figure 4:
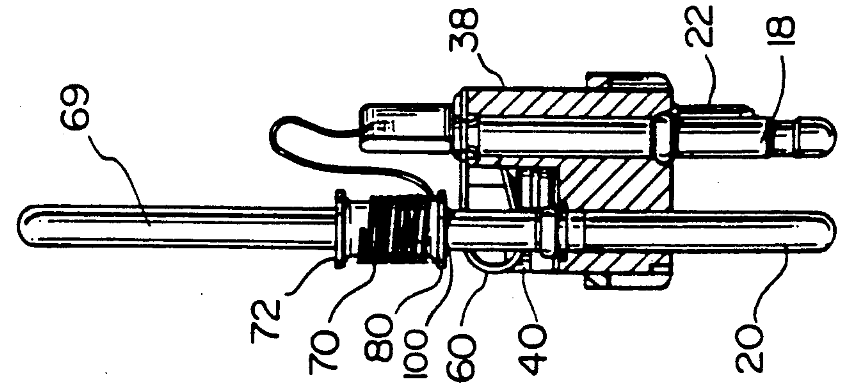
FIGS. 4 and 5 are composite vertical cross-sectional views of the assembled overload protector taken through FIG. 3 and with a housing and other parts omitted for clarity.
Figure 5:
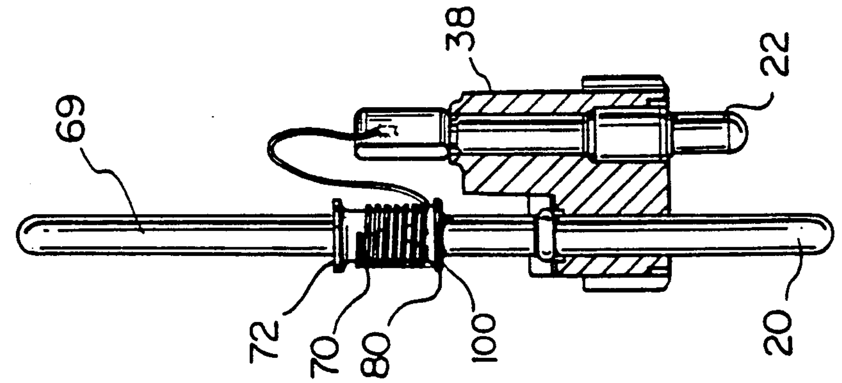
Figure 7:
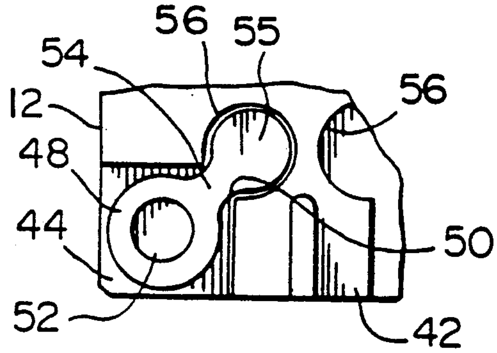
FIG. 7 is a plan view, in the direction of arrow VII in FIG. 2, of part of the assembly of the protector of the first embodiment.

Each of the semi-conductor voltage surge protection devices 26 is disposed at the base. To accommodate each of the devices 26, the base extends further into the chamber 16 at a thicker part 38, as shown in FIGS. 4 and 5, so as to define a recess 40 at one side of the base. The recess has a projection 42 from the end surface 44 of the recess (shown particularly in FIG. 2) to provide a shallow part of the recess flanked by two deeper recess parts at opposite sides of the projection 42. As is clear from the FIGS. 1 to 5, the outside plant pins 20 extend through holes 46 in the base so as to project from the recess surface 44 into the chamber 16. A signal conductor comprising conductor plate 48 is provided to electrically connect each of the outside plant pins 20 to a respective voltage surge protection device 26. Each conductor plate 48 has two part circular ends which merge to provide a waisted region 50. The one end of each plate is formed with a concentric hole 52 which tightly receives a respective pin 20 so as to make electrical engagement with it. Each plate 48 is retained by its pin 20 upon the end surface 44 of the recess with the waisted section 50 of the plate passing through a restricted part 54 of the recess (see FIG. 7). This locates the other semi-circular end 55 of the plate upon the end surface 44 in a section 56 of the recess which is of part cylindrical shape and is formed by opposing concave walls of the part 38 of the base and the projection 42 from the end surface 44. FIG. 7 shows the structure with a pin 20 and device 26 removed for clarity.

The ground terminal pin 18 extends through the part 38 of the base to terminate at the surface of the base defining the chamber 16. At that end of the pin there is provided a ground conductor 58. This ground conductor is a spring plate which comprises two U-shaped and in line legs 60 formed from a main end part 62 of the plate. The main end part of the plate is secured to the ground pin for electrical contact with it. One portion 63 of each leg 60 extends from the main end part 62 of the plate, and laterally of the ground terminal pin, across and contacting the part 38 of the base to project outwardly over the recess 40. Each leg 60 then extends downwardly at the base of its U-shape into the recess 40 with the other portion 65 of the leg 62 resiliently flexible relative to portion 63. The portions 65 of the legs 62 extend across the recess sections 56. Registration means is provided to locate the ground conductor 58 in a desired fixed position upon the base. The registration means comprises an extension 67 of the projection 42, the extension registering snugly between the two U-shaped legs 60 (FIG. 3).

Figure 8:
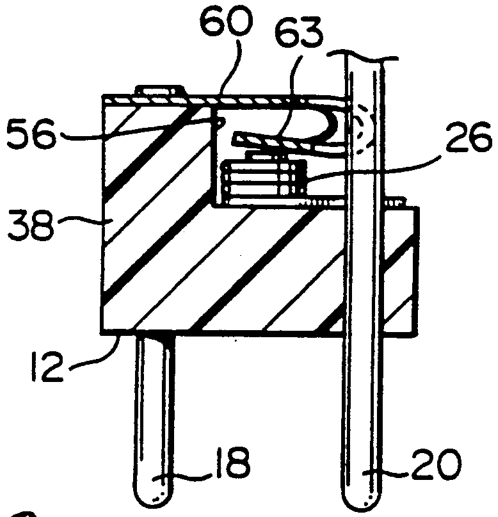
FIG. 8 is a cross-sectional view through the base after assembly of the component parts and taken along line VIII—VIII in FIG. 2.

As can be seen, with the parts of the protector assembled together, each voltage surge protection device 26 is housed within a respective recess section 56 and is contained between the free end of an associated conductor plate 48. In each recess section 56, a conductor plate 48 and a leg portion 65 engage the two electrodes disposed at the two sides of a respective voltage surge protection device 26. This is particularly clear from FIG. 8. Each leg 65 places a resilient down pressure upon its device 26 to ensure that the device remains in place during overvoltage conditions and does not disintegrate.

As can be seen from the above description, with the overvoltage protection devices disposed at the base, then the ground line, which includes the ground terminal pins 18 and the plate 58 may be of minimal size, i.e. they do not extend into the chamber 16 of the completed protector. Their positioning and size is commensurate with grounding contact with the voltage surge protection devices 26 so as to minimize the grounding path required from each of the outside plant pins 20 through the conductor plates 48, voltage surge protection devices 26 and through the ground plates 58 into the ground terminal pins 18. Minimization of the grounding elements including the overvoltage protection devices reduces the materials required to provide an operative overload protector. Reduction in the amount of materials for grounding purposes is accompanied by a reduction in cost and simplification in design.

Figure 9:
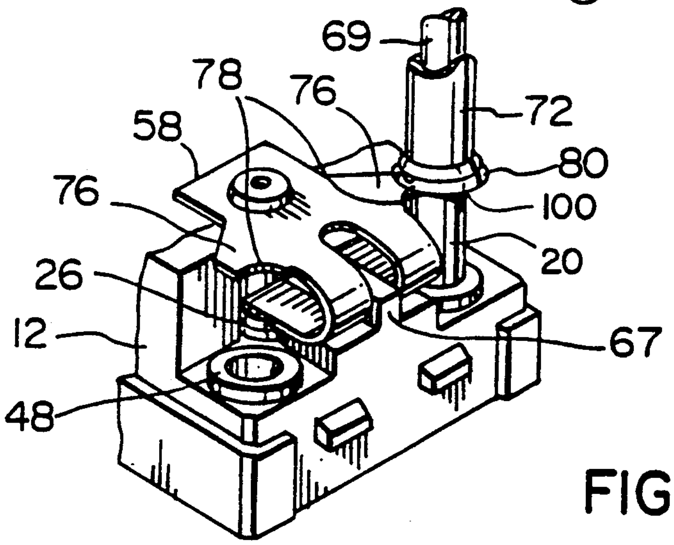
FIG. 9 is an isometric view of part of the assembly taken in the same direction as the exploded view of FIG. 2.

As can be seen more particularly from FIGS. 3, 4 and 5, the chamber 16 is provided substantially solely, for the purpose of accommodating spindles 69, which are formed as coaxial extensions of the outside plant pins 20, and the accompanying overcurrent protection devices provided on those spindles. Each overcurrent protection device comprises a coil 70 of electrical wire mounted upon a spool 72. The coil 70 and spool 72 may be of conventional construction for overcurrent protection devices. Each coil 70 is connected by its ends, and in conventional manner, to the two pins of its associated pair i.e. an outside plant pin 20 and a central office pin 22 (see particularly, FIGS. 4 and 5). Each spool 72 is mounted upon the spindle 69 of its pin 20 and is held in position axially along the pin by being soldered thereto in a position spaced from one side of respective leg portion 63 of the ground plate 58. Each spool is urged in a direction towards the ground plate and towards the base by a compression spring 74 (FIGS. 2 and 3 only) which surrounds the spindle 69 of the pin and is compressed between the spool and an upper part of the housing 14 (FIG. 3) when the housing is located in a position upon the base. As can be seen from FIG. 1, and particularly from FIG. 9, each side of each leg 60 of the ground plate 58 is provided with a projection 76 which extends partly around each of the two pins 20 and is spaced from each of the pins by a part circular edge surface 78. A lower end flange 80 of each of the spools 72 overlaps, in plan view, the extension 76.

Thus, if either signal line is subjected to overcurrent conditions sufficient to cause overheating of the coil and melting of the solder 100 between spool 72 and pin 20, the respective compression spring 74 forces the spool downwards so as electrically to engage the ground plate 58 thus grounding out the signal line.

What is claimed is:

1. An overload protector for a telecommunications system comprising:

a dielectric base and a dielectric housing extending from one side of the base to define a chamber with the base;

a ground means comprising a ground terminal pin extending from the other side of the base exteriorly of the chamber and a grounding structure electrically connected to the ground terminal pin and located entirely in the immediate vicinity of the base;

two pairs of signal terminal pins mounted within and extending from the other side of the base, each pair for a respective signal line;

an overcurrent protection device provided for each pair of signal pins, each overcurrent protection device connected in a signal line in series between the two pins of its respective pair and operable to connect the signal line to the ground terminal pin upon attainment of overcurrent conditions; and an overvoltage protection device provided for each pair of signal pins, each overvoltage protection device also located entirely in the immediate vicinity of the base and comprising a solid state semiconductor voltage surge protection device sandwiched between two electrodes, one electrode in electrical contact with a respective signal line and the other electrode in electrical contact with the grounding structure, each overvoltage protection device being operable upon attainment of overvoltage conditions in the respective signal line to permit current to pass from the signal line to the ground pin.

2. A protector according to claim 1 wherein the grounding structure extends across and engages one side of the base.

3. A protector according to claim 2 wherein registration means is provided upon said one side of the base and which registers with the grounding structure to locate the grounding structure in a desired fixed position upon the base.

4. A protector according to claim 1 wherein the grounding structure is embedded within the base.

5. A protector according to claim 1 wherein each solid state semi-conductor voltage surge protection device is embedded within the material of the base.

6. A protector according to claim 1 wherein each overcurrent protection device is secured upon a spindle by means which is affected by an increase in temperature for releasing the overcurrent protection device form its spindle, and means is provided for urging each overcurrent protection device towards the base upon release of the device so as electrically to connect the respective signal line to the ground terminal pin.

7. A protector according to claim 1 wherein each overcurrent protection device is secured upon a spindle by means which is affected by an increase in temperature for releasing the overcurrent protection device from the spindle, and means is provided for urging the overcurrent protection device towards the base upon release of the overcurrent protection device to enable the overcurrent protection device to engage a leg portion of a respective U-shaped leg of the ground conductor and electrically connect the respective signal line to the ground terminal pin.

8. A protector according to claim 6 wherein each spindle is a coaxially extending part of a terminal pin of a respective pair of signal terminal pins.

9. A protector according to claim 7 wherein each spindle is a coaxially extending part of a terminal pin of a respective pair of signal terminal pins.

10. An overload protector for a telecommunications system comprising:

a dielectric base and a dielectric housing extending from one side of the base to define a chamber with the base;

a ground means comprising a ground terminal pin extending from the other side of the base exteriorly of the chamber and a grounding structure electrically connected to the ground terminal pin and located entirely in the immediate vicinity of the base;

two pairs of signal terminal pins mounted within and extending from the other side of the base, each pair for a respective signal line;

an overcurrent protection device provided for each pair of signal pins, each overcurrent protection device connected in a signal line in series between the two pins of its respective pair and operable to connect the signal line to the ground terminal pin upon attainment of overcurrent conditions; and an overvoltage protection device provided for each pair of signal pins, each overvoltage protection device also located entirely in the immediate vicinity of the base and comprising a solid state semiconductor voltage surge protection device sandwiched between two electrodes, one electrode in electrical contact with a respective signal line and the other electrode in electrical contact with the grounding structure, each overvoltage protection device being operable upon attainment of overvoltage conditions in the respective signal line to permit current to pass from the signal line to the ground pin;

and the grounding structure extending laterally from the ground terminal pin at the base and having two U-shaped legs, one leg for each semi-conductor voltage surge protection device, and each U-shaped leg having two leg portions electrically connected together with a first leg portion electrically connected to and extending laterally from the ground terminal pin in one direction and a second leg portion extending from its connection with the second leg portion in the other direction laterally of the ground terminal pin, the second leg portion being in electrical contact with a respective semi-conductor voltage surge protection device.

11. A protector according to claim 10 wherein a registration means is provided upon said one side of the base, the registration means comprising an extension from the base which is registered between the two U-shaped legs of the grounding structure.

12. A protector according to claim 10 wherein said one side of the base is formed with a recess with the second leg portion of each U-shaped leg lying in the recess and engaging its respective semiconductor voltage surge protection device which is also disposed within the recess.

13. A protector according to claim 12 wherein the base has a projection extending into the recess to provide a shallow part of the recess flanked by two deeper recess parts at opposite sides of the projection, each deeper recess part housing a respective signal conductor and a semi-conductor voltage surge protection device, and the projection is formed with a registration extension which registers between the two U-shaped legs of the grounding structure.

14. A method of making an overvoltage protector for a telecommunications system comprising:

providing:

(i) a dielectric base and a dielectric housing for mounting upon one side of the base;

(ii) a ground means comprising a ground terminal pin and a grounding structure; and (iii) two pairs of signal terminal pins;

mounting the ground terminal pin and the two pairs of signal terminal pins through the base with the pins extending from the other side of the base and locating the grounding structure entirely in the immediate vicinity of the base and in electrical connection with the ground terminal pin and together with:

1) providing an overcurrent protection device for each pair of signal pins on the one side of the base by connecting the overcurrent protection device in a signal line in series between the two pins of its respective pair so as to be operable to connect the signal line to the ground terminal pin upon attainment of overcurrent conditions; and 2) providing an overvoltage protection device for each pair of signal pins, each overvoltage protection device comprising a solid state semi-conductor voltage surge protection device sandwiched between two electrodes and disposing the solid state semi-conductor voltage surge protection device entirely in the immediate vicinity of the base and electrically connecting it with one of its electrodes in electrical contact with a respective signal line and the other electrode in electrical contact with the grounding structure, each overvoltage protection device operable upon attainment of overvoltage conditions in its respective line to permit the current to pass from the signal line to the ground pin; and mounting the housing upon one side of the base, the overcurrent protection devices and the overvoltage protection devices sealed within the confines of the base and the housing assembly.

15. A method according to claim 14 comprising locating the grounding structure so as to extend across and engage one side of the base while lying entirely within the immediate vicinity of the base.

16. A method according to claim 15 comprising providing a registration means upon said one side of the base and registering the grounding structure with the registration means to locate the grounding structure in a desired fixed position upon the base.

17. A method according to claim 14 comprising providing the grounding structure with two U-shaped legs, one leg for each solid state semi-conductor voltage surge protection device and disposing the ground structure with a first leg portion of each leg, electrically connected to and extending laterally from the ground terminal pin in one direction, and a second portion of each leg extending from a connection with the first leg portion in the other direction and laterally of the ground terminal pin, the second leg portion being in electrical contact with a respective semi-conductor voltage surge protection device.

18. A method according to claim 17 comprising forming a registration means upon one side of the base, the registration means comprising an extension from the base, and registering the registration means between the two U-shaped legs of the grounding structure to locate the grounding structure in a desired fixed position upon the base.

19. A method according to claim 17 comprising forming said one side of the base with a recess, locating each solid state semi-conductor voltage surge protection device within the recess, and disposing the second leg portion of each U-shaped leg within the recess so as to engage its respective solid state semi-conductor voltage surge protection device.

20. A method according to claim 19 comprising forming a projection of the base extending into the recess to provide a shallow part of the recess flanked by two deeper recess parts at opposite sides of the projection, causing a respective signal terminal pin to pass through each deeper recess part as it is mounted in the base, disposing a solid state semi-conductor voltage surge protection device in each deeper recess part and in electrical contact with its respective signal terminal pin, and mounting the grounding structure upon the base, the projection formed with a registration means which registers between the two U-shaped legs of the grounding structure to locate the grounding structure in a desired fixed position upon the base.

* * * * *